United States Patent Office 3,219,565
Patented Nov. 23, 1965

3,219,565
METHOD OF PRODUCING 10α-METHYL STEROIDS
Menso Pieter Rappoldt, Van Houtenlaan, Weesp, Netherlands, assignor to North American Philips Company, Inc., New York, N.Y., a corporation of Delaware
No Drawing. Filed May 11, 1961, Ser. No. 109,278
Claims priority, application Netherlands, May 30, 1960, 252,140
7 Claims. (Cl. 204—162)

The invention relates to a method of producing 10α-methyl-5,7-dehydrosteroids by irradiation of the corresponding 10β-methyl steroids by ultra-violet light.

It is known that by irradiation of a 5,7-dehydro-10β-methyl steroid for example provitamin $D_2$ or provitamin $D_3$, steroids may be produced which have a 10α-methyl group instead of a 10β-methyl group.

The production of 9β,10α ergosterol (lumisterol-2) has been described by Windaus in "Annalen der Chemie," volume 493, pages 262 sqq. (1932). However, the yield of this reaction was comparatively small.

It has recently been found (cf. United States patent application Serial No. 805,020, filed April 8, 1959 now abandoned), that steroids containing a 10α-methyl group may have attractive pharmacological properties and that for this reason it is important that an efficient method of producing 10α-methyl steroids should be available.

According to a method described in the said application, lumisterol-2 or a corresponding steroid in which one or more nuclear hydrogen atoms of the cyclopentanoperhydrophenanthrene skeleton are replaced by a hydroxy group, which may be etherified or esterified, a halogen atom, a keto group or a lower aliphatic hydrocarbon group containing from 1 to 6 carbon atoms, may be subjected to degradation of the side chain, and subsequently desirable substituents may be introduced into the nucleus or into the remainder of the side chain of the lumisterol-2 in order to produce the desired 10α-methyl steroids. However, the advantage of this method, namely the fact that a 10α-methyl group is already present in the steroid skeleton, is associated with the disadvantage that this synthesis of the desired 10α-methyl steroids comprises a plurality of reaction stages. For this reason, it will be of importance if, on the one hand, one should be able to convert a 10β-methyl steroid to the corresponding 10α-methyl steroid with a comparatively high yield without, on the other hand, being compelled to perform a plurality of further reactions to introduce desirable substituents.

An elegant method has now been found which enables both advantages to be obtained in a single process. According to this method, one starts from a 10β-methyl steroid of the following formula:

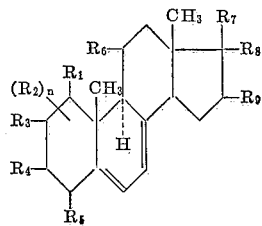

In this formula, $R_1$ is a hydrogen atom or an alkyl group containing from 1 to 6 carbon atoms, for example a methyl or an ethyl group. $R_2$ represents 0, 1 or more double bonds between the carbon atoms 2 and 3, 15 and 16 or 16 and 17, $n$ denoting the number of the double bonds. This number may be 0, 1 or 2. $R_3$ is a hydrogen atom or an alkyl group containing from 1 to 6 carbon atoms, for example a methyl or an ethyl group, or a hydroxy group which may be etherified or esterified, or a keto oxygen atom. $R_4$ is a hydrogen atom, a hydroxy group which may be etherified or esterified, or a keto oxygen atom which may be ketalized. $R_5$ is a hydrogen atom or a chlorine or a fluorine atom or one or two alkyl groups containing from 1 to 6 carbon atoms, for example methyl or ethyl groups. $R_6$ is a hydrogen atom or a hydroxy group which may be etherified or esterified, or a keto group which may be ketalized. $R_7$ is a hydrogen atom or an alkyl group which contains from 1 to 6 carbon atoms and may contain doubly or triply unsaturated bonds or hydroxy groups which may be etherified or esterified and/or a keto oxygen atom which may be ketalized. $R_8$ is a hydrogen atom or a hydroxy group which may be etherified or esterified, however, at least one of the groups $R_7$ and $R_8$ should not be a hydrogen atom. $R_9$ is a hydrogen atom or a hydroxy group which may be etherified or esterified or an alkyl group containing from 1 to 6 carbon atoms, for example a methyl or an ethyl group. In addition, an epoxy oxygen atom may be provided between the carbon atoms 16 and 17.

A, B, C and D denote the rings of the steriod skeleton according to common nomenclature.

The invention may be applied with particular advantage to the starting materials in which $R_1$ is a hydrogen atom, $R_2$ is no or one double bond in the ring D, $R_3$ is a hydrogen atom or a methyl or an ethyl group or a hydroxy group which may be esterified or etherified or a keto group ketalized, $R_4$ has the meaning given herein before, $R_5$ is a hydrogen atom, $R_6$ is a hydrogen atom or a hydroxy group which may be etherified or esterified or a keto group which may be ketalized, $R_7$ is a hydrogen atom or a —CO—CH$_3$ group or a —CO—CH$_2$OR group in which the keto groups may be ketalized whilst in the latter group R represents a hydrogen atom or an acyl group, and $R_8$ is a hydroxy group which may be etherified or esterified or a hydrogen atom, however, at least one of the groups $R_7$ and $R_8$ should not be a hydrogen atom, and $R_9$ is a hydrogen atom or a methyl group.

If a hydroxy group is etherified, it may be etherified with an aliphatic alcohol containing from 1 to 6 carbon atoms, for example methanol, ethanol, propanol, propanol-2, butanol, butanol-2, tert-butyl alcohol, pentanol or hexanol, or with benzyl alcohol.

If a hydroxy group is esterified, it may be esterified with a saturated or unsaturated aliphatic, aromatic or alicyclic carboxylic acid, for example formic acid, acetic acid, propionic acid, butyric acid, valeric acid, α-methylbutyric acid, β-methylbutyric acid, caproic acid, tert-butylacetic acid, trimethyl-acetic acid, cyclopentylcarboxylic acid, cyclohexylcarboxylic acid, cyclohexylacetic acid, o-toluenic acid, glutaric acid, β-methyl-glutaric acid, adipic acid, acrylic acid, crotonic acid, citraconic acid, maleic acid, benzoic acid, phenylacetic acid, phenylpropionic acid, palmitic acid, stearic acid, oleic acid. Esterification may be performed by reaction of the alcohol group with the acid chloride of the desired acid in the presence of pyridine or collidine or another acid binder and a solvent. Esterification may usually be performed at a temperature between 0° C. and 100° C.

A keto group may be ketalized by conversion into a normal ketal, a thioketal or a hemithioketal, for example by reaction with glycol or thioglycol.

For the sake of completeness, it should be noted that the starting compounds have the perhydrocyclopentanophenanthrene skeleton and that—unless designated otherwise—the carbon atoms are saturated. In other words: where it has been stated hereinbefore that the group $R_1$ is a hydrogen atom or an alkyl group, this actually means that to the carbon atom 1 of the steroid are attached either 2 hydrogen atoms or 1 hydrogen atom and an alkyl group, if the bond between carbon atoms 1 and 2 is saturated, but only either 1 hydrogen atom or 1 alkyl group, if the bond between carbon atoms 1 and 2 is unsaturated. The meaning of the formula should be similarly interpreted for the other substituents. With respect to the configuration of the various atoms or groups attached to the carbon skeleton, the following should be mentioned.

In the starting materials, the methyl group occupies the 10-position in $\beta$-configuration. This is also the case for the methyl group attached to the carbon atom 13. In these materials, the hydrogen atom at the 9-position has the $\alpha$-configuration. In the final products, however, the 10-methyl group has an $\alpha$-configuration and the 9-hydrogen atom a $\beta$-configuration, whilst the position of the 13-methyl group is unchanged. The choice of the starting materials is not restricted to predetermined configurations of the remaining substituents. If, for example, $R_1$ is an alkyl group, it may occupy the $\alpha$- or the $\beta$-position; if $R_5$ is a halogen atom, this also may be in $\alpha$- or in $\beta$-position. The same applies to the other substituents.

The starting materials are so chosen in such a manner that the ultraviolet absorption spectrum between 220 and 330 m$\mu$ is determined substantially only by the 5,7-dehydro system and is not influenced by the presence of substituents which either have a natural absorption between 220 and 330 m$\mu$ or materially influence the absorption of the 5,7-dehydro system. For this reason, the presence of a keto group or one or more double bonds in conjugation with the 5,7-dehydro system is out of the question unless the keto group should be ketalized. Furthermore, the starting materials should not contain a 17-keto group, since in the irradiation according to the invention a re-arrangement of the 18-methyl group may also take place.

In addition, no starting materials should be used containing a substituent providing steric hindrance of the 10-methyl group. In this respect, special attention should be paid to substituents in the 1, 9 or 11 positions of the steroid molecule.

According to the invention, the above-mentioned starting materials are irradiated by ultra-violet light in a special manner, in which reaction the desired corresponding 10$\alpha$-methyl-9$\beta$ (H) steroids are formed.

In the method according to the invention, a compound of the above defined group of steroids, either in the dissolved or in the dispersed state, is irradiated by ultra-violet light in two stages. In the first stage, it is irradiated with short-wave ultra-violet light and in the second stage with long-wave ultra-violet light. In this application, the expressions short-wave and long-wave ultra-violet light have the following meaning. Short-wave ultra-violet light is electromagnetic radiation of which at least part of the spectrum has a wavelength between 220 and 290 m$\mu$. Long-wave ultra-violet light is electromagnetic radiation of which at least part of the spectrum has a wavelength between 220 and 320 m$\mu$, the radiation energy of the region between 290 and 320 m$\mu$ being greater than that of the wavelength region between 220 and 290 m$\mu$. It should be noted that in both stages of the reaction the ultra-violet light may contain radiation of a wavelength greater than 320 m$\mu$. If, in the starting materials, a keto group occupies the 20-position, this group may react with the methyl group at the 13-position during the radiation reaction. This can be prevented by protecting the keto group at the 20-position, for example by conversion into a ketal. For this purpose, the thio- or hemithioketals have proved particularly suitable, however, the normal ketals may also be used. Of the ketals we may mention particularly the ethylene ketals, that is to say, the normal ethylene ketal, ethylene hemithioketal and ethylene thioketal. Not only a 20-keto group but also a 3- or an 11-keto group may be protected in this manner.

In carrying out the method in accordance with the invention, the starting materials are preferably dissolved or dispersed in a liquid having no absorption bands in the range in which the ultra-violet absorption necessary for the reaction takes place. This prevents the ultra-violet light from acting upon the reaction medium also. Suitable liquids are: lower aliphatic alcohols containing from 1 to 6 carbon atoms, for example methanol, ethanol, propanol, isopropanol, butanol, further more aliphatic ethers, for example dimethyl ether, diethyl ether, di-isopropyl ether, dipropyl ether, or cyclic ethers, for example dioxane, tetrahydrofurane, and also esters of lower aliphatic alcohols with lower aliphatic carboxylic acids, for example methyl acetate, ethyl acetate, methyl propionate, ethyl propionate, whist aliphatic or cyclic hydrocarbons, for example benzene, hexane, heptane, petroleum ether, petrol ligroin, benzine, cyclohexane or homogeneous mixtures of these liquids may also be used. A suitable concentration of the dissolved or dispersed starting material lies between 0.1 and 10% by weight. The sources of ultra-violet light containing short-wave radiation may be high-pressure or low-pressure mercury vapour lamps, hydrogen lamps, magnesium lamps, or chromium lamps. A high-pressure mercury lamp has proved to be highly suitable since per sq. cm. of the lamp surface area delivers much energy in the desired part of the spectrum. Suitable sources of ultra-violet light containing long-wave radiation are the above-mentioned radiation sources for short-wave ultra-violet light combined with suitable filters. These filters may be both liquids and glasses. With respect to liquid filters, reference is made to Bowen "Chemical Aspects of Light," 1940, page 277, where inter alia a liquid layer, one half millimetre thick, of carbon disulphide, an aqueous solution of potassium formate or of copper sulphate is recommended. Suitable glasses are described in Ellis and Wells "Chemical Action of Ultra-violet Rays," Reinhold (1941), pages 164–190, in particular page 181. Of the glasses described, we mention: "Pyrex" (thickness 1 to 3 mms.), "Quartzlite" thickness 2 or 0.2 mms.), "Helio" (thickness 2 mms.), "Vita" (thickness 2 to 3 mms.) and "Corning 774." During the irradiation, the bond between the carbon atoms 9 and 10 is temporarily broken with the presumable formation of seco steroids. These seco steroids are characterised by the following formula

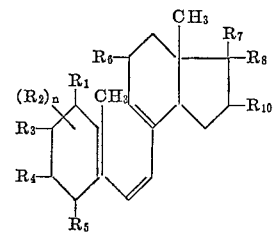

By continued irradiation, the bond between the carbon atoms may be restored. This gives rise to the formation of the desired 10$\alpha$-methyl steroids in addition to 10$\beta$-methyl-5,7-dehydrosteroids. The seco compounds are especially produced during the short-wave irradiation. These steroids may be produced both in the cis- and in the trans-form with respect to the configuration about the 6,7 double bond. Of these isomers, the cis-isomer has the lesser stability with respect to heating. Thermal conversion may already take place at room temperature (about 23° C.). In this conversion, a reaction product is formed which by continued irradiation cannot be converted any longer into the desired 10$\alpha$-methyl-5,7-dehydro steroid. However, the temperature and the duration of the radiation may be chosen so that the thermal reaction proceeds at a much slower rate than the light reaction. By using the highest possible irradiation energy and the lowest possible concentration of the compounds to be irradiated, it may be ensured that a minimum percentage of the irradiation products is converted into undesirable by-products. Since the conversion of the 10$\beta$- methyl-5,7-dehydro steroids into the 9,10 seco steroids takes place substantially under the action of short-wave irradiation, whilst the conversion of these seco steroids into the desired 10α-methyl-5,7-dehydro steroids takes place with long-wave radiation, the irradiation time of both stages should be chosen so that first a large amount of the 9,10 seco steroids is formed and only then the long-wave radiation starts. It is very difficult to give general directions for the process to be carried out so as to ensure minimum conversion of these so-called cis-seco steroids into useless by-products, for the optimum conditions are determined by a large number of factors a high percentage of which depends upon the radiation apparatus which happens to be used, its arrangement, the size of the irradiation vessel and the like. However, for a stationary and constant arrangement of the apparatus, the best reaction conditions may be determined without difficulty.

According to the above discussion of the aspects of the invention, the latter may be summarized as follows:

The invention comprises a method of producing 10α-methyl steroids, characterised in that a compound of the formula

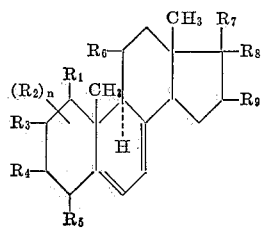

in which formula $R_1$ to $R_9$ have the meanings given hereinbefore, is irradiated in the dissolved or dispersed state by short-wave and subsequently by long-wave ultra-violet light, the corresponding 10α, 9β-5,7-dehydro steroids formed being subsequently isolated from the irradiation mixture.

The invention is of particular importance for the production of the following compounds:

(1) 9β,10α-pregna-5,7-diene-3β-ol-20-one from pregna-5,7-diene-3β-ol-20-one.

(2) 9β,10α-pregna-5,7-diene-3β,17α-diol-20-one from pregna-5,7-diene-3β,17α-diol-20-one. The latter compound is new and may be obtained by brominating the known 5-dehydro-pregnene-3β,17α-diol-20-one-3-acetate at the 7-position with N-bromosuccinimide, splitting off HBr from the resulting compound with collidine and saponifying the ester obtained.

(3) 9β,10α-pregna-5,7-diene-3β-ol-16,17-epoxy-20-one from 16,17-epoxy-pregna-5,7-diene-3β-ol-20-one. The latter compound is new and may be produced by brominating the known pregna-5-ene-3β-ol-16,17-epoxy-20-one-3-acetate at the 7-position with N-bromosuccinimide, splitting off HBr from the resulting compound with collidine and saponifying the ester obtained.

(4) 9β-10α-pregna-5,7-diene-3β-ol-16-methyl-20-one from 16-methyl-pregna-5,7-diene-3β-ol-20-one. The latter compound is new and may be obtained by brominating pregna-5-ene-3β-ol-16-methyl-20-one-3-acetate at the 7-position with N-bromosuccinimide, splitting off HBr from the compound obtained with tertiary amine and saponifying the resulting ester.

9β,10α-pregna-5,7-diene-3β,16-diol-20-one from pregna-5,7-diene-3β,16-diol-20-one. The latter compound is new and may be obtained by brominating pregna-5-ene-3β,16-diol-20-one-3,16-diacetate at the 7-position with N-bromosuccinimide, with subsequent splitting off of HBr with pyridine and saponification of the acetate groups with sodium hydroxide.

(6) 9β,10α-pregna-5,7-diene-3,20-dione-11,17-diol-3-ketal-11-acetate from pregna-5,7-diene-3,20-dione-11,17-diol-3-ketal-11-acetate. The latter compound is new and may be produced by ketalizing hydrocortisone-11-acetate, brominating at the 7-position with N-bromosuccinimide and dehydrobrominating with collidine.

All the 5,7-dehydro steroids mentioned in the above examples may be converted into the corresponding 9β, 10α-5,7-dehydro steroids by irradiation with ultra-violet light in the manner according to the invention and described more fully hereinafter.

*Example I*

11.6 gms. of pregna-5,7-diene-3β-ol-20-one produced in the manner described in "J. Org. Chem." 16, page 1126 (1951) were dissolved in 2.5 litres of tetrahydrofurane and irradiated by a 1500 W. high-pressure mercury vapour lamp at 20° C. for 45 minutes. Then a filter made of "Pyrex" glass 1 mm. thick, which absorbs ultra-violet light of a wavelength of less than 290 mμ was interposed between the lamp and the liquid, irradiation being continued for 1 hour. The irradiation was performed by means of an enlarged specimen of the apparatus described in "Rec. Trav. Chim." 73, page 393 (1954) by Havinga and Bots. On termination of the irradiation, the solvent was evaporated under reduced pressure and the residue was crystalized from 150 mls. of diethyl ether. 5.95 gms. of pregna-5,7-diene-3β-ol-20-one were filtered off, the mother liquor was concentrated by evaporation and the residue was dissolved in 20 mls. of benzene and 15 mls. of pyridine. A solution of 5 gms. of 3,5-dinitrobenzoylchloride in 20 mls. of benzene was added to this solution. After stirring for 1 hour at room temperature, the excess acid chloride was decomposed with water, diethyl ether was added and the reaction mixture was washed with, in succession, dilute sulphuric acid, sodium bicarbonate and water. After drying over sodium sulphate, the solution was concentrated by evaporation and the residue was crystallized with benzene. Yield 2.2 gms. of the dinitrobenzoate. Melting Point 217° C.–219° C.

0.73 gms. of 9β,10α-pregna-5,7-diene-3β-ol-20-one-dinitrobenzoate was dissolved in 225 mls. of methanol and, after the addition of 0.5 gms. of sodium carbonate in 3 mls. of water, boiled for 15 minutes. Water was added to the mixture, which was then extracted with diethyl ether. After concentration by evaporation, 0.33 gms. (73.5%) of 9β,10α-pregna-5,7-diene-3β-ol-20-one crystallized out from the ethereal solution. Melting point 188° C.–189° C. After another recrystallization from acetone, a product was obtained having a melting point of 191° C.–193° C. $\lambda_{max}=272$ mμ., $\epsilon=9,900$.

*Example II*

A solution of 19.4 gms. of androsta-5,7-diene-3,17-diol in 2 litres of ethanol was irradiated by a high-pressure mercury lamp (Philips HOV 1500 w.) for half an hour. After the lamp had been provided with a filter absorbing all the light having wavelengths of less than 285 mμ, irradiation was continued for 4 hours. During the irradiation, the solution was cooled so that its temperature did not exceed 22° C. The solution was concentrated by evaporation to 200 mls. and then cooled to −10° C. 6.36 gms. of unconverted starting material crystalized out and were drawn off. The mother liquor was concentrated by evaporation to a viscous mass, to which 50 mls. of ether were added. Further 1.75 gms. of starting material now crystallized out. The solution was filtered and then concentrated by evaporation, the residue being dissolved in 100 mls. of acetone. After cooling for one night to −10° C., the resulting crystallizate was drawn off: 3.09 gms. of 9β, 10α-androsta-5,7-diene-3,17-diol, i.e. 27.3% of the substance converted. After purification by recrystallization from acetone and methanol, the melting point was 187° C.–188.5° C. The ultra-violet absorption spectrum is identical with that of lumisterol-2.

What is claimed is:

1. The method of converting pregna-5,7-diene-3β-ol- 20-one to 9β, 10α pregna-5,7-diene-3β-ol-20-one comprising subjecting first to short-wave ultraviolet radiation and then to long-wave ultraviolet radiation solvated pregna-5,7-diene-3β-ol-20-one and then separating out the resultant 9β, 10α pregna compound.

2. The method of converting pregna-5,7-diene-3β,17α-diol-20-one to 9β, 10α-pregna-5,7-diene-3β,17α-diol-20-one comprising subjecting first to short-wave ultraviolet radiation and then to long-wave ultraviolet radiation solvated pregna-5,7-diene-3β,17α-diol-20-one and then separating out the resultant 9β, 10α pregna compound.

3. The method of converting pregna-5,7-diene-3β-ol-16,17 - epoxy - 20 - one to 9β,10α - pregna-5,7-diene-3β-ol-16,17-epoxy-20-one comprising subjecting first to short-wave ultraviolet radiation and then to long-wave ultraviolet radiation solvated pregna-5,7-diene-3β-ol-16,17-epoxy-20-one and then separating out the resultant 9β, 10α pregna compound.

4. The method of converting pregna-5,7-diene-3β-ol-16-methyl-20-one to 9β, 10α-pregna-5,7-diene-3β-ol-16-methyl-20-one comprising subjecting first to short-wave ultraviolet radiation and then to long-wave ultraviolet radiation solvated pregna-5,7-diene-3β-ol-16-methyl-20-one and then separating out the resultant 9β, 10α pregna compound.

5. The method of converting pregna-5,7-diene-3β,16-diol-20-one to 9β, 10α-pregna-5,7-diene-3β, 16-diol-20-one comprising subjecting first to short-wave ultraviolet radiation and then to long-wave ultraviolet radiation solvated pregna-5,7-diene-3β, 16-diol-20-one and then separating out the resultant 9β, 10α pregna compound.

6. The method of converting pregna-5,7-diene-3,20-dione-11,17-diol-3-ketal-11-acetate to 9β, 10α-pregna-5,7-diene-3,20-dione-11,17-diol-3-ketal-11-acetate comprising subjecting first to short-wave ultraviolet radiation and then to long-wave ultraviolet radiation solvated pregna-5,7-diene-3,20-dione-11,17-diol-3 - ketal - 11 - acetate and then separating out the resultant 9β, 10α pregna compound.

7. The method of producing a Δ5,7 10α methyl, 9β hydrogen, 13β methyl steroid selected from the group consisting of those Δ5,7 10α methyl, 9β hydrogen, 13β methyl pregnanes and androstanes wherein carbon atom 1 of the steroid nucleus is substituted by a substituent selected from the group consisting of hydrogen and alkyl of 1–6 carbon atoms, carbon atom 2 of the steroid nucleus is substituted with a member selected from the group consisting of hydrogen, alkyl of 1–6 carbon atoms, hydroxy, keto, ethylene ketal, ethylene hemithioketal, alkoxy of 1–6 carbon atoms, ethylene thioketal, benzyloxy and acyloxy, carbon atom 3 of the steroid nucleus is substituted with a substituent selected from the group consisting of hydrogen, keto, ethylene ketal, hydroxy, ethylene hemithioketal, ethylene thioketal, alkoxy of 1–6 carbon atoms, benzyloxy and acyloxy, carbon atom 4 of the steroid nucleus is substituted with a substituent selected from the group consisting of hydrogen, fluorine, chlorine and from one to two alkyls of 1–6 carbon atoms, carbon atom 11 of the steroid nucleus is substituted with a substituent selected from the group consisting of hydrogen, hydroxy, acyloxy, alkoxy of 1–6 carbon atoms, benzyloxy, keto, ethylene thioketal, ethylene ketal and ethylene hemithioketal, carbon atom 13 of the steroid nucleus is substituted with methyl, carbon atom 16 of the steroid nucleus is substituted with a substituent selected from the group consisting of hydrogen, hydroxy, acyloxy, benzyloxy, alkoxy of 1–6 carbon atoms, alkyl of 1–6 carbon atoms and epoxy oxygen joining the carbon atom 16 of the steroid nucleus to the carbon atom 17 of the steroid nucleus, carbon atom 17 of the steroid nucleus is substituted with a substituent selected from the group consisting of hydrogen, alkyl of 1–6 carbon atoms, ethylene thioketal, ethylene ketal, ethylene hemithioketal,

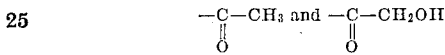

and a substituent selected from the group consisting of hydroxy, acyloxy and alkoxy of 1–6 carbon atoms and up to one carbon to carbon double bond being present at the positions 2 (3), 15 (16) and 16 (17) of the steroid nucleus, the total number of said double bonds not being greater than one and the remaining valences of the steroid nucleus being satisfied by hydrogen, comprising subjecting first to short-wave and then to long-wave ultraviolet radiation the corresponding solvated 10β-methyl, 9α hydrogen steroid and then separating out the resultant 10α methyl, 9β hydrogen steroid.

References Cited by the Examiner
UNITED STATES PATENTS
2,924,596   2/1960   Djerassi et al. _____ 260—239.55

OTHER REFERENCES
Rappoldt et al.: "Rec. Trav. Chim." volume 80 (1961), pages 43–46.

LEWIS GOTTS, Primary Examiner.
LESLIE H. GASTON, IRVING MARCUS,
Examiners.